US008358695B2

(12) United States Patent
Stojancic et al.

(10) Patent No.: US 8,358,695 B2
(45) Date of Patent: Jan. 22, 2013

(54) METHODS AND APPARATUS FOR PROVIDING A SCALABLE MOTION ESTIMATION/COMPENSATION ASSIST FUNCTION WITHIN AN ARRAY PROCESSOR

(75) Inventors: Mihailo M. Stojancic, Berkeley, CA (US); Gerald George Pechanek, Cary, NC (US)

(73) Assignee: Altera Corporation, San Jose, CA (US)

( * ) Notice: Subject to any disclaimer, the term of this patent is extended or adjusted under 35 U.S.C. 154(b) by 1363 days.

(21) Appl. No.: 11/736,837

(22) Filed: Apr. 18, 2007

(65) Prior Publication Data
US 2008/0059546 A1    Mar. 6, 2008

Related U.S. Application Data

(60) Provisional application No. 60/795,139, filed on Apr. 26, 2006.

(51) Int. Cl.
| | |
|---|---|
| H04N 7/12 | (2006.01) |
| H04N 11/02 | (2006.01) |
| H04N 5/14 | (2006.01) |
| G06K 9/00 | (2006.01) |
| G06K 9/36 | (2006.01) |
| G06F 15/00 | (2006.01) |
| H04N 7/26 | (2006.01) |
| H04N 7/36 | (2006.01) |
| G06T 7/00 | (2006.01) |
| G06T 7/20 | (2006.01) |

(52) U.S. Cl. ......... 375/240.16; 375/240.15; 375/240.17; 382/107; 382/236; 348/700; 712/20
(58) Field of Classification Search ............ 375/240.16, 375/240.15, 240.17; 382/236, 107; 348/700; 712/20
See application file for complete search history.

(56) References Cited

U.S. PATENT DOCUMENTS 5,475,856 A * 12/1995 Kogge ......................... 712/20
6,622,234 B1    9/2003 Pechanek et al.
(Continued)

FOREIGN PATENT DOCUMENTS
EP    1845730 A1 * 10/2007

OTHER PUBLICATIONS

Swamy, P.N.; Chakrabarti, I.; Ghosh, D.; "Architecture for motion estimation using the one-dimensional hierarchical search block-matching algorithm"; Computers and Digital Techniques, IEE Proceedings—vol. 149, Issue: 5, Digital Object Identifier: 10.1049/ip-cdt:20020428; Publication Year: Sep. 2002, pp. 229-239.*

Primary Examiner — Eleni Shiferaw
Assistant Examiner — Courtney Fields
(74) Attorney, Agent, or Firm — Law Offices of Peter H. Priest, PLLC (57) ABSTRACT

An apparatus is described for attaching a motion search hardware assist unit to a processing element and its local memory. A current macro block storage unit is attached to a local memory interface unit for storage of a copy of a current macro block from the local memory. A search window reference storage unit having N rows is attached to a local memory interface unit for storage of a copy of N rows of pixels from a search window from the local memory. N independent arithmetic pipelines are attached to the current macro block storage unit and the search window reference storage. Each pipeline operates on one of the N rows of the search window reference storage unit and a corresponding row of the current macro block of the current macro block storage unit. An accumulator is attached to the N independent pipelines to accumulate results from the N arithmetic pipelines, to produce independent results for different organizations of macro blocks.

20 Claims, 7 Drawing Sheets

U.S. PATENT DOCUMENTS

| | | |
|---|---|---|
| 7,257,696 B2 | 8/2007 | Pechanek et al. |
| 7,940,844 B2 * | 5/2011 | Lai et al. .................. 375/240.16 |
| 2002/0009144 A1 * | 1/2002 | Ishihara et al. .......... 375/240.16 |
| 2002/0097343 A1 * | 7/2002 | Rovati et al. ................. 348/700 |
| 2004/0042551 A1 * | 3/2004 | Acharya et al. .......... 375/240.16 |
| 2006/0204046 A1 * | 9/2006 | Xia et al. ...................... 382/107 |
| 2008/0133892 A1 | 6/2008 | Pechanek et al. |
| 2009/0016438 A1 * | 1/2009 | McDade et al. ......... 375/240.16 |

* cited by examiner

Fig. 1

X Luminance sample
O Chrominance sample

Fig. 2 x Luminance sample
O Chrominance sample

← Time

METHODS AND APPARATUS FOR PROVIDING A SCALABLE MOTION ESTIMATION/COMPENSATION ASSIST FUNCTION WITHIN AN ARRAY PROCESSOR

RELATED U.S. APPLICATION DATA

The present application claims the benefit of U.S. Provisional Application No. 60/795,139, filed Apr. 26, 2006, which is incorporated by reference herein in its entirety.

FIELD OF THE INVENTION

The present invention relates generally to improvements in parallel data processing architectures for video processing and more particularly to apparatus and methods for providing a scalable motion estimation/compensation assist function within an array processor.

BACKGROUND OF THE INVENTION

Increasing demand for high definition TV products, including interactive TV in a HD format and HD video compression encoding and decoding, requires increasing sophistication, flexibility, and performance in the supporting electronics. The sophistication, flexibility, and performance requirements for HD TV exceeds the capabilities of current generations of processor architectures by, in many cases, orders of magnitude.

The demands of video encoding for HD formats are both memory and data processing intensive, requiring efficient and high bandwidth memory organizations coupled with compute intensive capabilities. In addition, a video encoding product must be capable of supporting multiple standards each of which includes multiple optional features which can be supported to improve image quality and further reductions in compression bandwidth. Due to these multiple demands, a flexible parallel processing approach must be found to meet the demands in a cost effective manner.

A number of algorithmic capabilities are generally common between multiple video encoding standards, such as MPEG-2, H.264, and SMPTE-VC-I. Motion estimation/compensation and deblocking filtering are two examples of general algorithms that are required for video encoding.

Motion estimation is computationally the most expensive part of a video encoding process. On average it takes about 60-80% of the total available computational time, thus having the highest impact on the speed of the overall encoding process. It also has a major impact on the visual quality of encoded video sequences.

A digital video sequence consists of a series of pictures (combined luminance and chrominance samples) arranged in a temporal succession. It may contain either progressive or interlaced frames (frame and field pictures), which may be mixed together within the same video stream.

Motion estimation/compensation methods used by video coding algorithms exploit this temporal picture structure by reducing the redundancy inherent in video sequences. They represent a central part of the video encoding process of MPEG-4 AVC H.264 and SMPTE-VC-1 video encoding standards.

The most common motion estimation algorithms are block matching algorithms operating in the time domain. Here motion vectors are used to describe the best temporal prediction for a current block of pixels to be encoded. A time domain prediction error between the current block of pixels and the reference block of pixels is formed, and a search is performed to minimize this value. The best motion vector minimizes a cost function based on the prediction block distance and the block pixel difference.

Multiple different criteria have been proposed for evaluation of the best match between the current and the reference blocks of pixels. They are of different complexity and efficiency in terms of finding the global optimum over a given search area. The sum of absolute differences (SAD) and the mean absolute difference (MAD) have been commonly used in the past.

To efficiently support motion estimation algorithms and other complex programmable functions, which may vary in requirements across the multiple standards, a processor by itself would require significant parallelism and very high clock rates to meet the requirements. A processor of this capability would be difficult to develop in a cost effective manner for commercial products.

SUMMARY OF THE INVENTION

It will be highly advantageous to efficiently address the high computational requirements of the motion estimation/compensation problem in a flexible, programmable array processor environment with specially designed, autonomous hardware assists tightly coupled to the processing elements and outside of the processing element execution pipeline. This would allow for real time encoding of HD video sequences in accordance with multiple different digital video standards.

In one or more of its several aspects, the present invention addresses problems such as those described above. In one of its aspects, the present invention describes an apparatus that allows improvements in motion search capability in a SIMD array processor.

In an embodiment of the present invention an apparatus is described for attaching a motion search hardware assist unit to a processing element and its local memory. A current macro block storage unit is attached to a local memory interface unit, wherein iterative operations initiated by a processing element instruction copy a current macro block from the local memory to the current macro block storage. A search window reference storage unit having N rows is attached to a local memory interface unit, wherein N rows of pixels from a search window are copied from the local memory to the search window reference storage unit. N independent arithmetic pipelines are attached to the current macro block storage unit and the search window reference storage, wherein each pipeline operates on one of the N rows of the search window reference storage unit and a corresponding row of the current macro block of the current macro block storage unit. An accumulator is attached to the N independent pipelines to accumulate results from the N arithmetic pipelines, to produce independent results for different organizations of macro blocks.

A further embodiment of the present invention addresses a method for motion search. An A×B macro block is loaded into a motion search storage unit from a memory associated with a processing element, wherein the motion search storage unit is located in a hardware assist unit attached to the processing element. At least one row of B pixels of a search window is loaded into a search window storage from the memory. An arithmetic result is calculated in at least one arithmetic pipeline a function of a row of B pixels from the search window storage and the corresponding A rows of the current macro block from the motion search storage unit. The A arithmetic results from the at least one arithmetic pipeline are summed. The loading of rows of B pixels of the search window into a search window storage, calculating an arithmetic result, and summing the A arithmetic results for different organizations of macro blocks are repeated for all pixels in the search window.

These and other features, aspects, techniques and advantages of the present invention will be apparent to those skilled in the art from the following detailed description, taken together with the accompanying drawings and claims.

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Further details of attaching an application specific hardware assist function within an array processor for use in conjunction with the present invention is found in U.S. Provisional Application Ser. No. 60/795,140 entitled "Methods and Apparatus for Attaching Application Specific Functions Within an Array Processor" filed Apr. 26, 2006 and incorporated by reference herein in its entirety.

Figure 1:
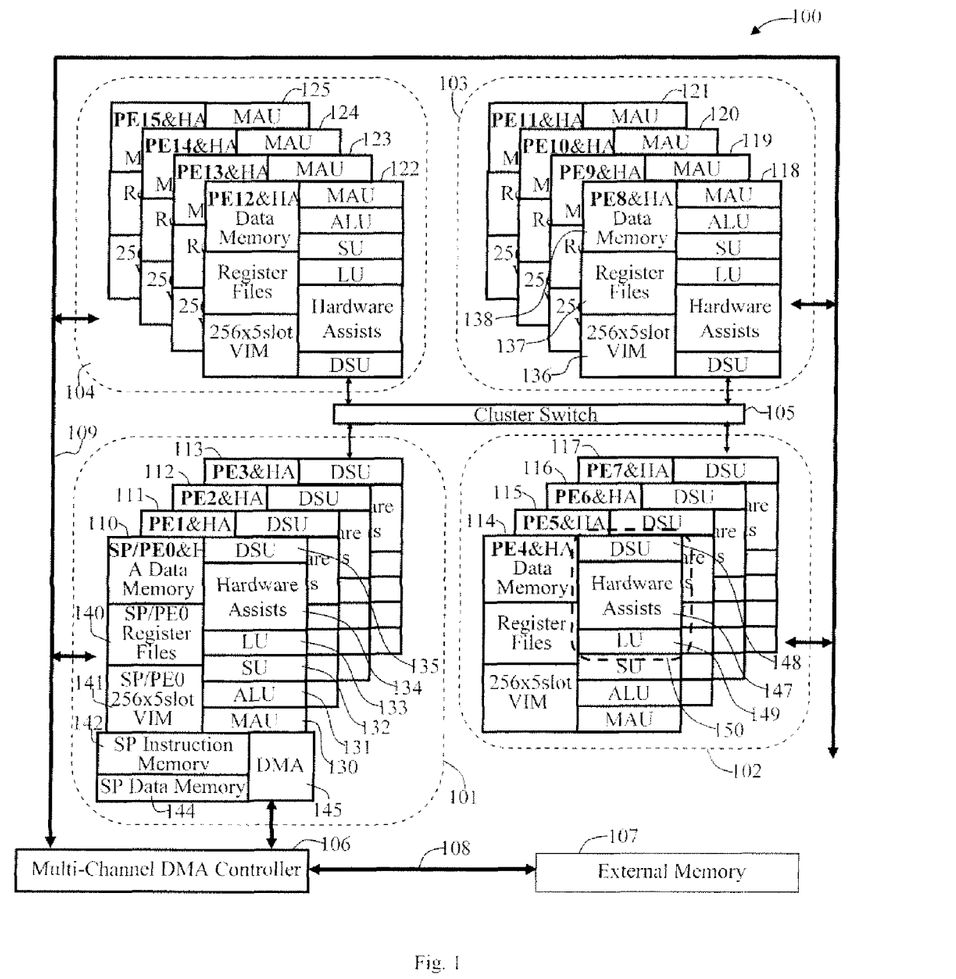
FIG. 1 illustrates a sixteen node video signal processor ($VSP_{16}$) in accordance with one or more embodiments of the present invention.

FIG. 1 illustrates a sixteen-node video signal processor ($VSP_{16}$) 100 in accordance with one or more embodiments of the present invention. The $VSP_{16}$ 100 contains four transform, engine (TE) clusters 101-104, an interconnection network cluster switch 105, a multi-channel direct memory access (DMA) controller 106, and an external memory 107. The DMA controller 106 interfaces with the external memory 107 over an external memory bus 108 to transfer data to and from the external memory to each of the TE clusters over a multi-channel DMA bus 109.

Sixteen processor engines (PEs) 110-125 are partitioned in groups of four PEs per cluster as a 4×4 array organization. Each PE provides programmable processing and hardware assist functions. SP/PE0 110 is unique as compared to the other fifteen PEs, 111-125, having an array controlling function combined with the PE function of PE0. The common features of the sixteen PEs 110-125 include a set of instruction execution units including a multiply accumulate unit (MAU) 130, an arithmetic logic unit (ALU) 131, a store unit (SU) 132, a load unit (LU) 133, a hardware assist (HA) 134, a data select unit (DSU) 135, a 256×5 slot very long instruction word memory (VIM) 136, a local PE register file 137, and a data memory 138 local to each PE and HA. Each PE also contains local pipeline controls, decode logic, and control logic appropriate for each PE. All $VSP_{16}$ instructions are executed in a simple pipeline with a majority of instructions requiring a single execution stage and a few instructions requiring two execution stages that are pipelined.

The unique SP/PE0 110 combines a controlling function sequence processor (SP) combined with PE0 functions. To support the SP and PE0, a separate SP register file and a separate PE0 register file, illustrated in one block as SP/PE0 register files 140 are used to maintain the processing context of the SP and PE0. Though not limited to this, the SP/PE0 shares a single VIM 141. To control the $VSP_{16}$ the SP has a single thread of control supported by an SP instruction memory 142 and an SP data memory 144. The SP provides program control, contains instruction and data address generation units, supports interrupts, provides DMA control, and dispatches instructions to the PEs 110-125. The SP executes branches and controls the fetching and issuing of instructions, such as load VLIW and execute VLIW instructions. The load VLIW instruction provides an indirect VIM address and is used to load the instruction slots at the specified VIM address. The execute VLIW instruction causes a VLIW to be selected at a specified indirect VIM address and executed.

The single SP thread of control supports 4×4 sub-threads which operate synchronously in lock step single instruction multiple data (SIMD) fashion. Each sub-thread uses very long instruction words (VLIWs) which are indirectly selected and executed by the single SP thread. Each VLIW in each PE at the same VIM address may be different but all unmasked PEs access the same VIM address when executing a VLIW. Five 32-bit instruction slots are provided in each PE, such that with 16 PEs 80 32-bit instructions can execute simultaneously. In addition single, dual, quad, and octal packed data operations may be specified independently by each slot instruction thereby supporting up to 8*80=640 instruction specified operations per cycle. As an example of the processing power this provides, a $VSP_{16}$ operating at 250 Mhz may achieve 640*250 Mhz=160 Giga operations per second.

The $VSP_{16}$ processor also uses an interconnection network cluster switch 105 providing single cycle data transfers between PEs within clusters and between PEs in orthogonal clusters. The communication operations are controlled by a DSU instruction which can be included in a VLIW thereby overlapping communications with computations which with proper software pipelining the communication latency can be reduced to zero. The communication operations operate independently of the DMA which may operate in the background to stream data between the local PE memories and the external memories.

To support additional processing capability for application specific functions such as motion estimation/compensation and other high compute functions, a hardware assist (HA) unit with advantageous independent connections to local PE memory is provided. A HA unit has one or more multi-cycle tightly coupled state machine functions which provide memory intensive application specific operational capability to each of the PEs in the VSP$_{16}$. For example, HA unit 147 interfaces with DSU 148 and LU 149 and the local data memory associated with PE4 114 as a transform engine 150.

Digital Video Picture Structure

Figure 2:
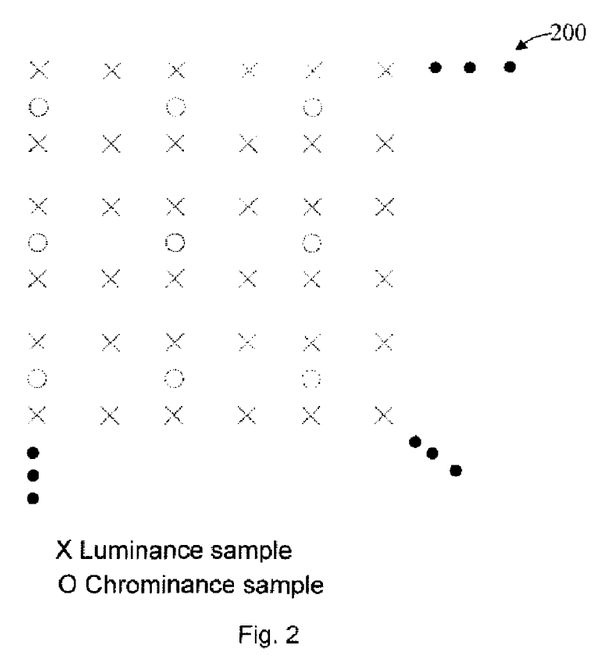
FIG. 2 illustrates an example spatial location of vertical and horizontal 4:2:0 luminance and chrominance samples in progressive picture frames.

A digital video sequence consists of a series of pictures (combined luminance and chrominance samples) arranged in a temporal succession. It may contain either progressive or interlaced frames, which may be mixed together within the same video stream. An example spatial location 200 of vertical, and horizontal 4:2:0 luminance and chrominance samples in progressive frames are illustrated in FIG. 2.

A frame of video contains two fields, the top field and the bottom field, which are interleaved. The two fields of an interlaced frame are separated in time by a field period (which is half the time of a frame period). They may be coded separately as two field pictures or together as a frame picture. A progressive frame is always coded as a single frame picture. However, a progressive frame is still considered to consist of two fields (at the same instant in time) so that other field pictures may reference the sub-fields of the frame.

Figure 3:
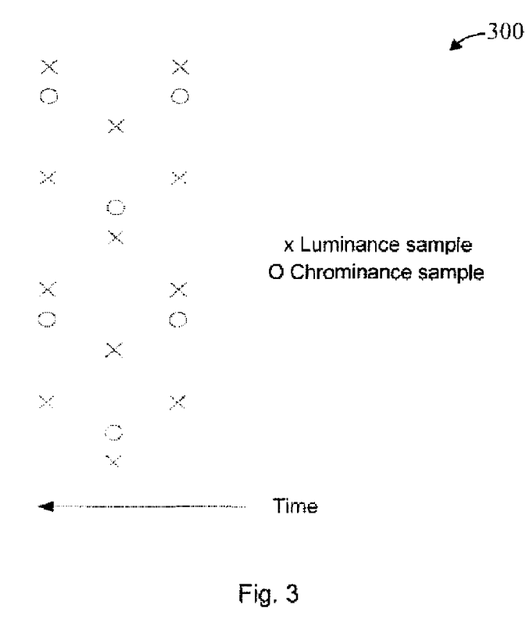
FIG. 3 illustrates the vertical and temporal sampling positions of samples in a 4:2:0 format interlaced picture frames.

The vertical, and temporal sampling positions 300 of samples in a 4:2:0 format interlaced frames are shown in FIG. 3.

Figure 4:
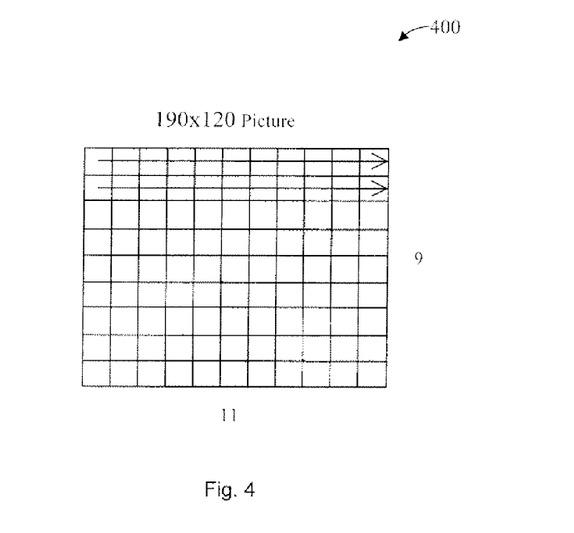
FIG. 4 illustrates a picture frame with 190×120 pixels, divided into ninety-nine 16×16 macroblocks.

For video coding, in general, both frame and field pictures are divided into macroblocks of 16×16 luminance samples each, with two associated 8×8 chrominance samples. For instance, a picture frame 400 with 190×120 pixels is divided into ninety-nine 16×16 macroblocks as indicated in FIG. 4.

Figure 5:
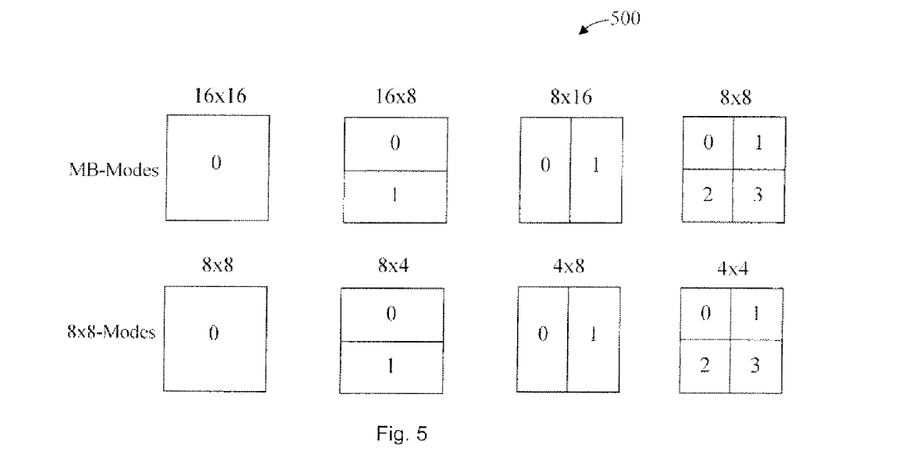
FIG. 5 indicates how macroblocks, including a 16×16 macroblock and an 8×8 partition, are divided into sub-blocks.
Figure 6:
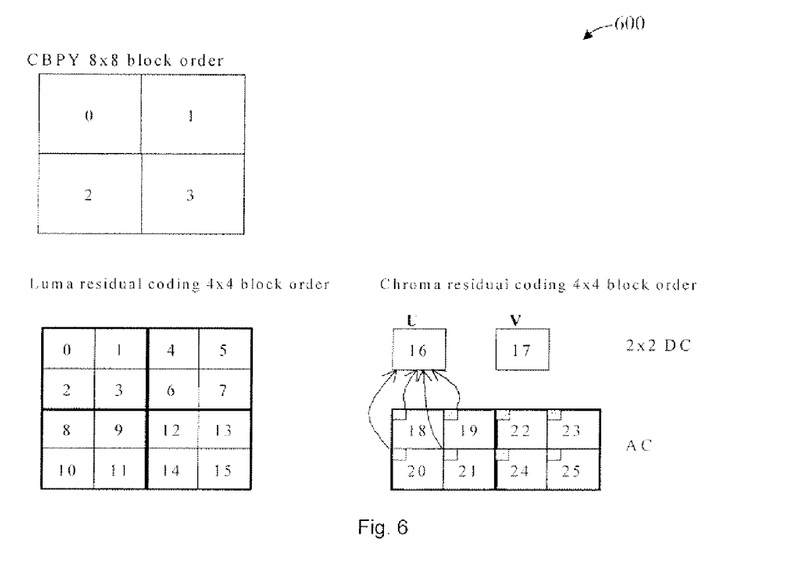
FIG. 6 illustrates the order of the different syntax elements resulting from coding such a macroblock as indicated in FIG. 5.

FIGS. 5 and 6 indicate how macroblocks 500, including a 16×16 macroblock and an 8×8 macroblock partition, are divided into sub-blocks, and the order 600 of the different syntax elements resulting from coding such a macroblock. FIG. 5 illustrates the numbering of vectors for different blocks depending on the inter mode. FIG. 6 illustrates the ordering of blocks for CBPY and residual coding of 4×4 blocks.

Motion Estimation

Figure 7:
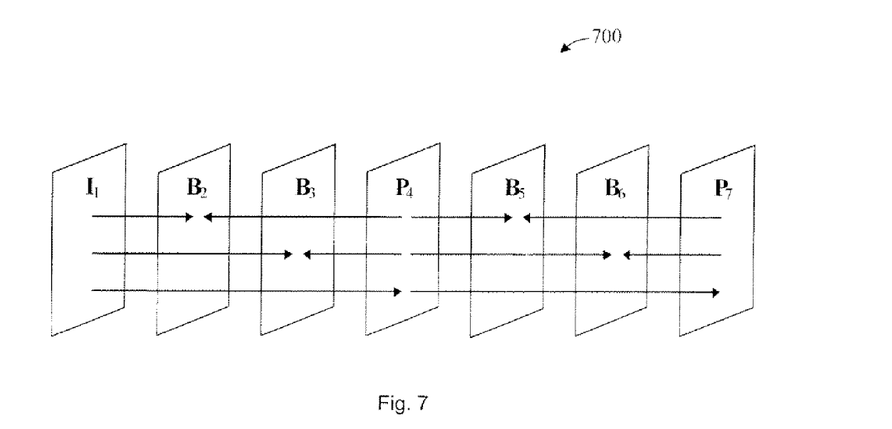
FIG. 7 illustrates an example of the predictive structure of a digital video sequence with two B-type pictures inserted between the I-type and the P-type pictures.

In inter-picture motion estimation current pictures (macroblocks) may be predicted from either or both the previous and subsequent reconstructed pictures. FIG. 7 illustrates one example of the predictive structure of a digital video sequence 700 with two B-type pictures inserted between the I-type and the P-type pictures. For simplicity of presentation the entire picture frames are indicated as a single type. However, in general, each slice (a group of MBs within a picture frame), and each individual MB can be coded as a B, a P or an I-type. B-type pictures/slices/MBs are predicted based on passed and future reference picture frames. P-type pictures/slices/MBs are predicted based on passed picture frames only. I-type pictures/slices/MBs do not contain any temporal prediction. The decision with picture type prediction to use may be made on the macroblock/block level. Hence a single picture frame may contain multiple prediction type macroblocks.

Motion estimation/compensation methods used by video coding algorithms exploit the temporal picture structure by reducing the redundancy inherent in the video sequences. The most common motion estimation algorithms are block matching algorithms operating in the time domain. Here motion vectors are used to describe the best temporal prediction for a current block of pixels to be encoded. A time domain prediction error between the current block of pixels and the reference block of pixels is formed, and a search is performed to minimize this value.

Figure 8:
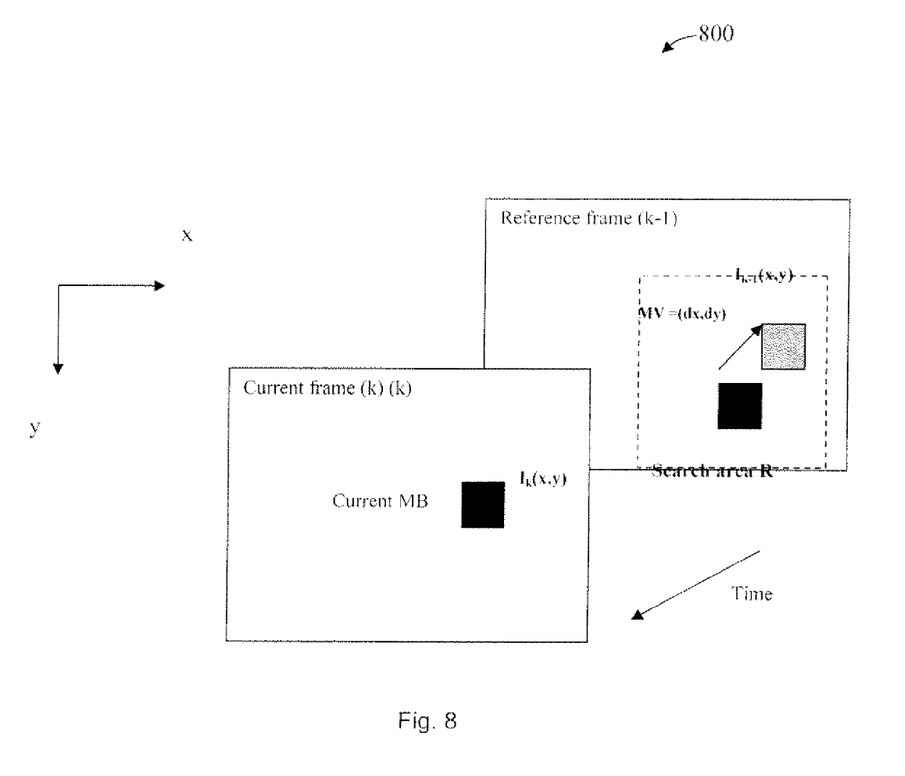
FIG. 8 illustrates the process of prediction of a current MB by a MB from a passed reference picture frame.

FIG. 8 illustrates the process of prediction of a current MB by a MB from a passed reference picture frame. A block of pixels of the current video frame which is in the search range of a passed frame (in temporal order), is compared with all possible spatial positions within the search range, looking for the smallest possible difference. For the best matching reference block, a motion vector (MV) is derived which describes the relative position of the two blocks as shown in FIG. 8.

For example, for an N×N block, the best motion vector is the one which minimizes a cost function based on a distance criterion:

$$MV=\min_{(dx,dy)}\text{Matching Criterion}(I_k(x,y),I_{k-1}(x+dx,y+dy)),$$

where (dx,dy) represent spatial displacement of the prediction macroblock, and $I_k(x,y)$ and $I_{k-1}(x+dx,y+dy)$ are pixel values at the current picture frame k, and the reference picture frame k−1, respectively.

Multiple different criteria have been proposed for the best match evaluation. They are of different complexity and efficiency in terms of finding the global optimum over a given search area. The sum of absolute differences (SAD) is the most commonly used criteria for the best match evaluation. With reference to FIG. 8, the SAD criterion used in the design described in this submission is given by the equation:

$$SAD(dx, dy) = \sum_{m=x}^{x+N-1} \sum_{n=y}^{y+N-1} |I_k(m, n) - I_{k-1}(m + dx, n + dy)|$$

The hardware assist (HA) unit for block matching search, denoted as DSU_ms, is capable of performing full search (within a search window of programmable size) for integer pixel motion, vectors calculation at 16×16 macroblock level, it is capable of simultaneous extraction of results for 16×16, 16×8, 8×16, 8×8, and 4×4 motion search based on the SAD criterion for each particular block size and given search range. The minimum search range used is +/−16 (32×32 pixels search window area). The hardware is also capable of setting up a coarse, hierarchical, search (through a special HA instruction) by automatically decimating pixels of a larger search range (64×64, for example) and bringing the 32×32 search area into the pipelined compute engines. Partial search results (SAD for each current block position within the search range) can be made available in multiple miscellaneous register file (MRF) registers for further processing, or stored in a local HA/PE memory.

DSU_ms Hardware Assist Module for Motion Search

As stated above, this HA module contains logic and independent multi-cycle state machines to perform motion compensated search within, a predefined search range of a reference picture. Its operation is initiated and the results are collected by a set of HA instructions. The unit operates autonomously in the PE and with a local memory that it is attached to on a given MB and a given search range of a reference picture, and in parallel with other HA units attached to other PEs. Standard DSU instructions do not interfere with this HA unit and can be issued in parallel with the operations of this unit. The results of the HA unit are collected in the miscellaneous register group, and/or in the local HA/PE memory. A general block diagram of a multi-cycle multi-pipeline motion search HA unit architecture 900 is presented in FIG. 9.

Figure 9:
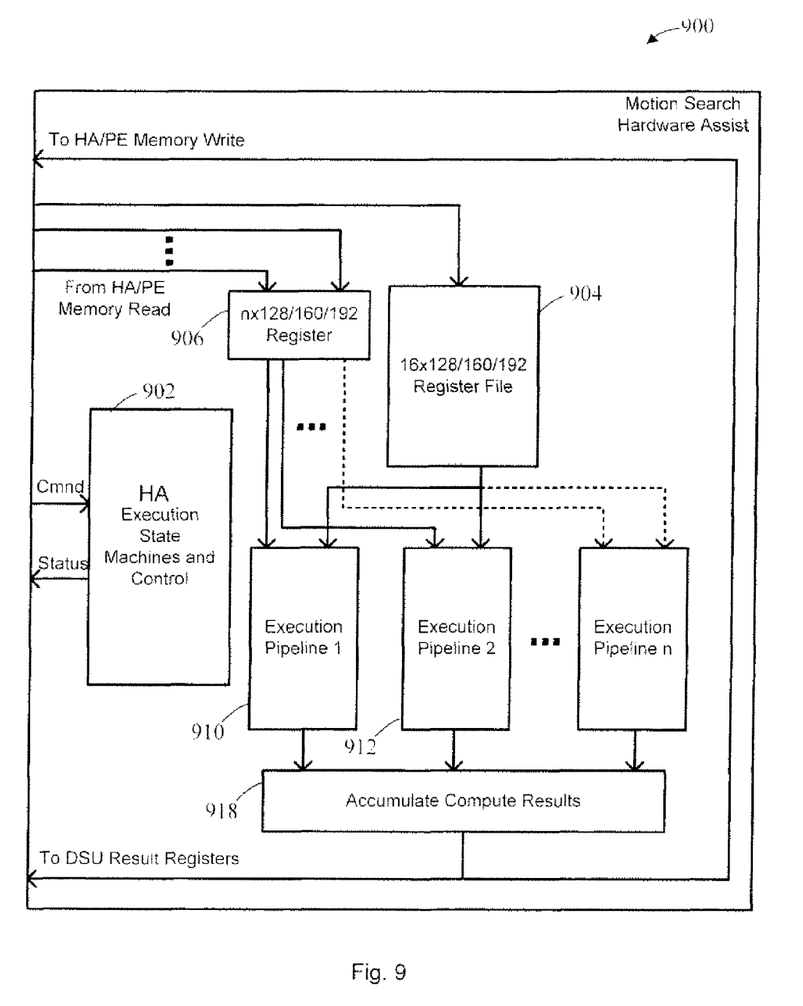
FIG. 9 presents a general block diagram of an autonomous, multi-cycle, multi-pipeline motion search hardware assist (HA) unit, tightly coupled to a PE and controlled by an independent state machine outside of the processor execution pipeline.

As indicated in FIG. 9, for a current 16×16 MB each pipeline calculates the Sum of Absolute Differences (SAD) at various positions of the current MB within the SW of the reference picture frame. As an example, the basic calculation steps for a double execution pipeline controlled by the HA execution state machines and control unit 902, and executed by the pipelined data paths are listed below:

1. Load a 16×16 MB into the local MSRF (16 registers by 128/160/192) 904.
2. Simultaneously load 16 pixels of the search window (SW) first and second rows into the SWRF (n=2 registers by 128/160/192) 906.
3. By using two independent pipelines, such as execution pipeline1 910 and execution pipeline2 912, calculate simultaneously the absolute difference between the (SW) rows and the corresponding rows of the current MB by using an absolute value of the difference function. Simultaneously load the next two rows of the SW pixels in SWRF 906.
4. Sum the 16 absolute difference values from the first row. Simultaneously calculate the sum of the 16 absolute difference values from the second row. Simultaneously load the $3^{rd}$ and the $4^{th}$ rows of the SW pixels in SWRF 906.
5. Accumulate results from both pipelines and produce independent results for 16×16, 16×8, 8×16, 8×8, and 4×4 blocks in accumulate compute results 918.
6. Store results in the HA/PE local memory, such as the data memory 138 associated with PE8 118 of FIG. 1, Store selected SAD values and status in the MRF result/status registers in the DSU associated with the PE.
7. Repeat step 2 and follow on steps while moving down two rows through the SW and the MB register file.

Figure 10:
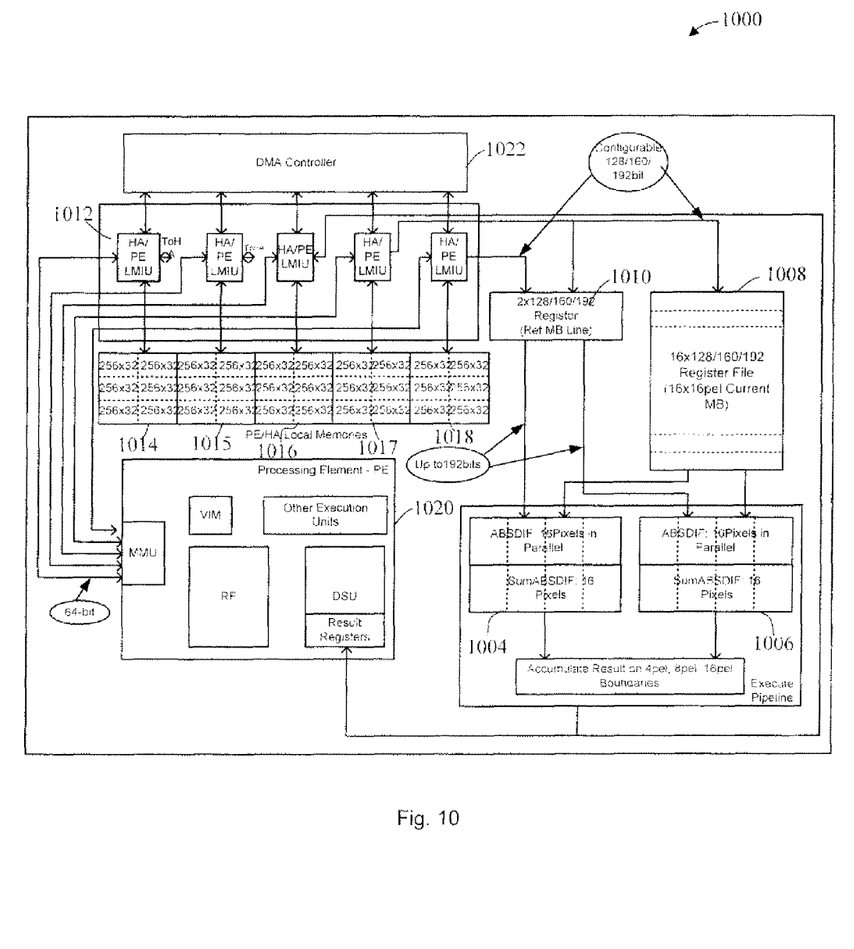
FIG. 10 presents a block diagram describing the motion search hardware structure with two independent pipelines simultaneously operating on two rows of the current picture frame MB and the reference picture frame MB. It also shows the local memory interconnect network with 5 independent memory modules, each broken into 6 256×32 units, and independently accessed by the HA, PE and the DMA controller.

FIG. 10 presents a more detailed block diagram 1000 describing the motion search structure with two independent pipelines 1004 and 1006 simultaneously operating on two rows of the current MB stored in register file 1008 and the corresponding rows of the search window (SW) stored in SWRF 1010. It also shows the local memory interconnect network with 5 independent memory modules 1014-1018, each broken into 6 256×32 units, independently accessed by the PE 1020 and the DMA controller 1022.

While the present invention has been disclosed in the context of various specific illustrative embodiments, it will be recognized that the invention may be suitably applied to other environments and applications consistent with the claims which follow.

We claim:

1. An apparatus for attaching a motion search hardware assist function to a processing element (PE) and its local memory, the apparatus comprising:
   a PE attached to a local memory;
   a current macro block storage unit separately attached to the local memory;
   a hardware assist controller coupled to the PE, wherein iterative operations, initiated in the hardware assist controller by a processing element instruction received from the PE, copy a current macro block from the local memory to the current macro block storage unit;
   a search window reference storage unit having storage for N rows of pixels from a search window, the search window reference storage unit attached to the local memory separate from the PE attachment to the local memory, wherein the N rows of pixels from a search window are copied from the local memory to the search window reference storage unit;
   N arithmetic pipelines attached to the current macro block storage unit and the search window reference storage unit, wherein each arithmetic pipeline is independent of the other N−1 arithmetic pipelines, provides the same function on different data, and is configured to operate under control of the hardware assist controller in parallel with the other N−1 arithmetic pipelines on a different row of the N rows of pixels accessed from the search window reference storage unit and a corresponding row of the current macro block of the current macro block storage unit; and
   an accumulator attached to the N arithmetic pipelines and configured to accumulate results from the N arithmetic pipelines, to produce independent results for different organizations of macro blocks.

2. The apparatus of claim 1 wherein the current macro block storage unit is a 16×16 pixel register file.

3. The apparatus of claim 1 wherein the arithmetic pipeline calculates a sum of absolute value of differences.

4. The apparatus of claim 1 further comprises the accumulator attached to the local memory, wherein the accumulator operates to store the independent results in the local memory.

5. The apparatus of claim 1 further comprises the accumulator attached to the processing element, wherein the accumulator operates to store selected results and status in architected registers in the processing element.

6. The apparatus of claim 1 further comprises:
   a plurality of processing elements; and
   a plurality of motion search hardware assist units individually attached to corresponding processing elements of the plurality of processing elements.

7. A method for motion search comprising:
   loading an A×B macro block into a motion search storage unit from a memory attached to a hardware assist unit (HAU) by a HAU memory bus, wherein the memory is separately attached to a processing element (PE) by a PE memory bus and the motion search storage unit is located in the hardware assist unit attached to the processing element by a PE bus;
   loading at least one row of B pixels of a search window into a search window storage unit located in the hardware assist unit over the HAU memory bus from the memory;
   calculating arithmetic results in at least one arithmetic pipeline of a function of the at least one row of B pixels from the search window storage and a corresponding row of the A×B macro block from the motion search storage unit;
   summing the arithmetic results from the at least one arithmetic pipeline; and
   repeating in a pipeline sequence loading of subsequent rows of B pixels of the search window from the memory over the HAU memory bus into the search window storage unit, the calculating of the arithmetic results, and the summing of the arithmetic results for the A rows of the A×B macro block and for different organizations of macro blocks for pixels in the search window, wherein the repeating operations are concurrent with PE instruction executed accesses of the memory over the PE memory bus.

8. The method of claim 7 further comprises:
   storing over the HAU memory bus completed search arithmetic results in the local memory.

9. The method of claim 7 further comprises:
   storing over the PE bus selected completed search results and status in architected registers in the processing element.

10. The method of claim 7, wherein the function is a sum of absolute differences.

11. The method of claim 7, wherein the processing element receives hardware assist instructions dispatched from an array controlling function to initiate and control operations on the attached hardware assist unit.

12. An apparatus for parallel processing comprising:
- a plurality of processing elements (PEs), wherein each PE is operable to receive and execute instructions;
- a plurality of PE data memories, each PE data memory directly coupled to a corresponding PE of the plurality of PEs, wherein the corresponding PE is operable to access macro block data from the directly coupled corresponding PE data memory in response to operation of a load instruction execution unit; and
- a plurality of hardware assist units (HAUs), each HAU is separately and directly coupled to the corresponding PE and separately and directly coupled to the corresponding PE data memory and each HAU includes a control unit providing state machines and operational control, hardware assist memories, and a plurality of execution pipelines, wherein the plurality of HAUs are individually configured to provide a scalable motion search assist function that operates in parallel with operations on the plurality of PEs.

13. The apparatus of claim 12, wherein the control unit controls operation of the plurality of execution pipelines on macro blocks for a pre-specified search window of a reference picture.

14. The apparatus of claim 12, wherein the control unit controls iterative operations to repeat loading of rows of B pixels of a search window into a search window storage unit, calculating of arithmetic results, and summing of the arithmetic results for the loaded rows of an A×B macro block for different organizations of macro blocks in the search window.

15. The apparatus of claim 12, wherein the control unit controls iterative operations initiated by the corresponding PE to load a current macro block from the corresponding PE data memory to a current macro block storage unit located in the directly coupled HAU.

16. The apparatus of claim 12, wherein the hardware assist memories include a current macro block storage unit and a search window reference storage unit both separately and directly coupled to the corresponding PE data memory.

17. The apparatus of claim 16, wherein the search window reference storage unit is configured to store N rows of macro block pixels that are loaded from a search window stored in the corresponding PE data memory.

18. The apparatus of claim 12, wherein the plurality of execution pipelines are directly coupled to a current macro block storage unit and to a search window reference storage unit and each execution pipeline is configured to operate on a row of macro block pixels accessed from the search window reference storage unit and a corresponding row of the current macro block accessed from the current macro block storage unit.

19. The apparatus of claim 18, wherein an accumulator is attached to the plurality of execution pipelines to accumulate results from the plurality of execution pipelines and produce independent results for different organizations of macro blocks.

20. The apparatus of claim 12, wherein the corresponding PE data memory comprises a first separate path to the corresponding PE, a second separate path to the directly coupled HAU, and a third separate path to a direct memory access (DMA) controller.

* * * * *